United States Patent
Bayoumi

(10) Patent No.: US 10,554,167 B2
(45) Date of Patent: Feb. 4, 2020

(54) SOLAR CARPORT MODULE

(71) Applicant: King Abdulaziz University, Jeddah (SA)

(72) Inventor: Mohannad Bayoumi, Jeddah (SA)

(73) Assignee: King Abdulaziz University, Jeddah (SA)

(*) Notice: Subject to any disclaimer, the term of this patent is extended or adjusted under 35 U.S.C. 154(b) by 105 days.

(21) Appl. No.: 15/692,493

(22) Filed: Aug. 31, 2017

(65) Prior Publication Data
US 2019/0068111 A1    Feb. 28, 2019

(51) Int. Cl.
| | |
|---|---|
| *H02S 20/32* | (2014.01) |
| *H02S 40/38* | (2014.01) |
| *H02S 30/10* | (2014.01) |
| *E04H 6/04* | (2006.01) |
| *E04H 6/02* | (2006.01) |
| *H02S 40/10* | (2014.01) |

(Continued)

(52) U.S. Cl.
CPC ............ *H02S 20/32* (2014.12); *E04H 6/025* (2013.01); *E04H 6/04* (2013.01); *F24S 25/10* (2018.05); *H02S 20/10* (2014.12); *H02S 20/23* (2014.12); *H02S 20/30* (2014.12); *H02S 30/10* (2014.12); *H02S 40/10* (2014.12); *H02S 40/38* (2014.12); *E04C 3/02* (2013.01)

(58) Field of Classification Search
CPC .... H02S 20/10–26; H02S 30/10; H02S 30/20; H02S 20/30; H02S 20/32; H02S 40/10; H02S 40/12; F24S 30/422; F24S 2030/134; F24S 2030/135; F24S 2025/012
See application file for complete search history.

(56) References Cited

U.S. PATENT DOCUMENTS

| | | | |
|---|---|---|---|
| 4,660,879 A * | 4/1987 | Kobayashi | B62D 35/007 296/180.5 |
| 7,557,292 B2 | 7/2009 | Shingleton et al. | |

(Continued)

FOREIGN PATENT DOCUMENTS

| | | |
|---|---|---|
| CN | 205883139 U | 1/2017 |
| DE | 202011102826 U1 | 1/2012 |

(Continued)

OTHER PUBLICATIONS

Aluart Systembau GMBH, "A Carport that Can Do More", URL: http://www.aluartsysteme.de/solar-energy-integration/carport-solar.html, 2 Pages total, (Apr. 25, 2017).

*Primary Examiner* — Eric R Smith
(74) *Attorney, Agent, or Firm* — Oblon, McClelland, Maier & Neustadt, L.L.P.

(57) ABSTRACT

A solar carport module including a support structure to provide shelter to a vehicle, the support structure having a pair of trusses rotatably affixed to a ground surface on which vehicle is parked, a plurality of photovoltaic panels mounted between the pair of trusses to provide solar electricity, a battery assembly that electrically connects the plurality of photovoltaic panel to receive, regulate, and store the solar electricity, an articulation system that rotates the pair of trusses between a shelter position and a service position, and an electrical control unit configured to detect a maximum sunlight exposure position and to operate the articulation system to place the plurality of photovoltaic panels in the maximum sunlight exposure position.

10 Claims, 11 Drawing Sheets

(51) Int. Cl.
*H02S 20/10* (2014.01)
*H02S 20/23* (2014.01)
*F24S 25/10* (2018.01)
*H02S 20/30* (2014.01)
*E04C 3/02* (2006.01)

(56) References Cited

U.S. PATENT DOCUMENTS

| | | | | |
|---|---|---|---|---|
| 2010/0051015 | A1* | 3/2010 | Ammar | F24S 23/82 126/600 |
| 2011/0221203 | A1* | 9/2011 | Miller | F03D 9/007 290/55 |
| 2013/0118099 | A1* | 5/2013 | Scanlon | G01J 1/0228 52/173.3 |
| 2013/0285595 | A1* | 10/2013 | Eaton, Jr. | H01L 31/042 320/101 |
| 2015/0316639 | A1* | 11/2015 | Russ | H02S 20/00 250/203.4 |
| 2016/0352285 | A1* | 12/2016 | Seery | H02S 30/20 |

FOREIGN PATENT DOCUMENTS

| | | | |
|---|---|---|---|
| EP | 1696087 | A1 | 8/2006 |
| EP | 2292877 | A1 | 3/2011 |
| WO | 2011/140557 | A1 | 11/2011 |

\* cited by examiner

SOLAR CARPORT MODULE

BACKGROUND

Field of the Disclosure

The present disclosure relates to carports and particularly carports that harvest solar energy.

Description of the Related Art

In today's energy market, producing electricity in a renewable way is essential.

Such a demand in renewable energy can be addressed by collecting or harvesting energy from renewable resources such as sunlight which is naturally replenished quasi perpetually.

To this end, energy production systems relying on photovoltaic panels with different configurations and/or arrangements to enhance sunlight exposure have been employed. Notably, conventional solar carports that rely on photovoltaic panels mounted onto elevated structures configured to receive vehicles, e.g. parking structures and/or garage roofs, to generate electricity while minimizing usable space occupied by the photovoltaic panels have been adopted.

Although such conventional solar carports are used, they present important drawbacks. Notably, in these conventional solar carports, the photovoltaic panels may easily be covered by light obstructing materials, e.g. dust, sand, leaves, and/or other debris, which can affect energy production, and cleaning and/or servicing these photovoltaic panels may often be required. Cleaning and/or servicing the photovoltaic panels on these conventional solar carports may be complex and time consuming tasks as these photovoltaic panels are difficult to reach or access.

Thus, a solar carport module solving the aforementioned limitations of servicing and/or cleaning the photovoltaic panels is desired.

SUMMARY

Accordingly, one object of the present disclosure is to provide a solar carport module which overcomes the above-mentioned limitations of servicing and/or cleaning the photovoltaic panels.

The solar carport module of the present disclosure provides accessibility to the photovoltaic panels via a support structure that can be articulated to position the photovoltaic panels within reach of a user standing on the ground surface that supports the solar carport.

In one non-limiting illustrative example, a solar carport module is presented. The solar carport module includes a support structure to provide shelter to a vehicle, the support structure having a pair of trusses rotatably affixed to a ground surface on which the vehicle is parked, a plurality of photovoltaic panels mounted between the pair of trusses to provide solar electricity, a battery assembly that electrically connects the plurality of photovoltaic panels to receive, regulate, and store the solar electricity, an articulation system that rotates the pair of trusses between a shelter position and a service position, wherein in the shelter position the plurality of photovoltaic panels are substantially parallel to the ground surface and in the service position the photovoltaic panels are manually reachable by an user standing on the ground surface.

In one non-limiting illustrative example, a carport module is presented. The solar carport module includes a support structure to provide shelter to a vehicle, the support structure having a pair of trusses rotatably affixed to a ground surface on which the vehicle is parked, a plurality of photovoltaic panels mounted between the pair of trusses to provide solar electricity, a battery assembly that electrically connects the plurality of photovoltaic panels to receive, regulate, and store the solar electricity, an articulation system that rotates the pair of trusses between a shelter position and a service position, and an electrical control unit configured to detect a maximum sunlight exposure position and to operate the articulation system to place the plurality of photovoltaic panels in the maximum sunlight exposure position.

In one non-limiting illustrative example, a carport module is presented. The solar carport module includes a support structure to provide shelter to a first vehicle and a second vehicle, the support structure having a first pair of trusses to receive the first vehicle and rotatably affixed to a ground surface on which the first vehicle is parked, and a second pair of trusses adjacent to the first pair of trusses to receive the second vehicle and rotatably affixed to ground surface on which the second vehicle is parked, a plurality of photovoltaic panels mounted between the first pair of trusses and between the second pair of trusses to provide solar electricity, a battery assembly that electrically connects the plurality of photovoltaic panels to receive, regulate and store the solar electricity, an articulation system that rotates the first pair of trusses and the second pair of trusses between a shelter position and a service position, wherein in the shelter position the plurality of photovoltaic panels are substantially parallel to the ground surface and in the service position the photovoltaic panels are manually reachable by a user standing on the ground surface.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
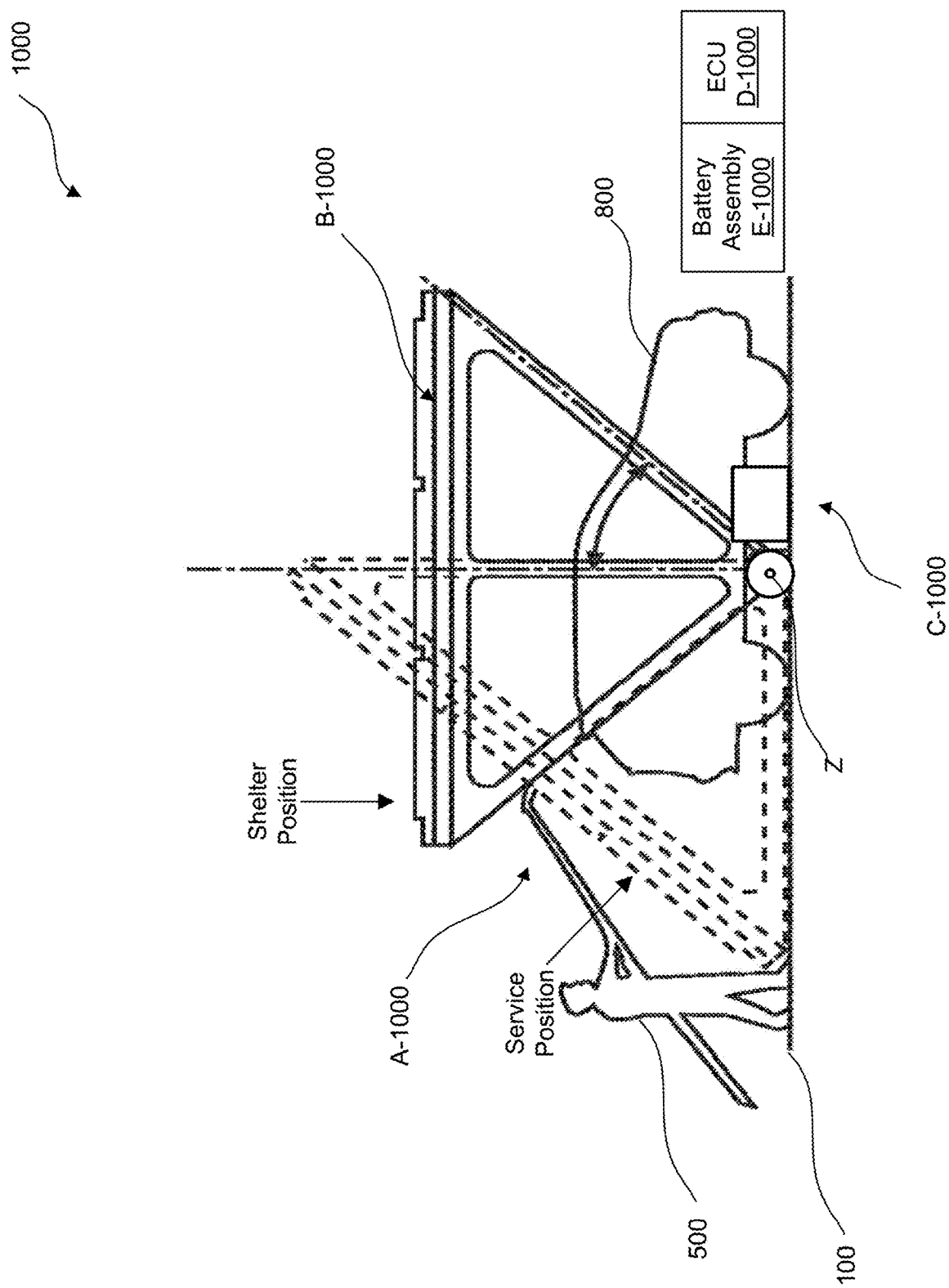
FIG. 1 is a side view of a carport module, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

FIG. 1 is a side view of a carport module 1000, according to certain aspects of the disclosure.

The carport module 1000 is configured to be articulated between a shelter position, as illustrated in FIG. 1 with solid lines, to provide protection for vehicles 800, e.g. standard size passenger cars and/or light-duty trucks, and harvest solar energy, and a service position, as illustrated in FIG. 1 with dashed lines, to be serviced, maintained, and/or cleaned from a ground level without the need of tools, e.g. cranes, ladders.

The carport module 1000 can include a support structure A-1000, a plurality of photovoltaic panels B-1000 mounted onto the support structure A-1000, an articulation system C-1000 that articulates the support structure A-1000 between the service position, illustrated in FIG. 1 with dashed lines, and the shelter position, illustrated in FIG. 1 with solid lines, a battery assembly E-1000 that electrically connects the plurality of photovoltaic panels B-1000, and an electrical control unit D-1000 in communication with the plurality of photovoltaic panels B-1000, the articulation system C-1000, and the battery assembly E-1000.

Figure 4:
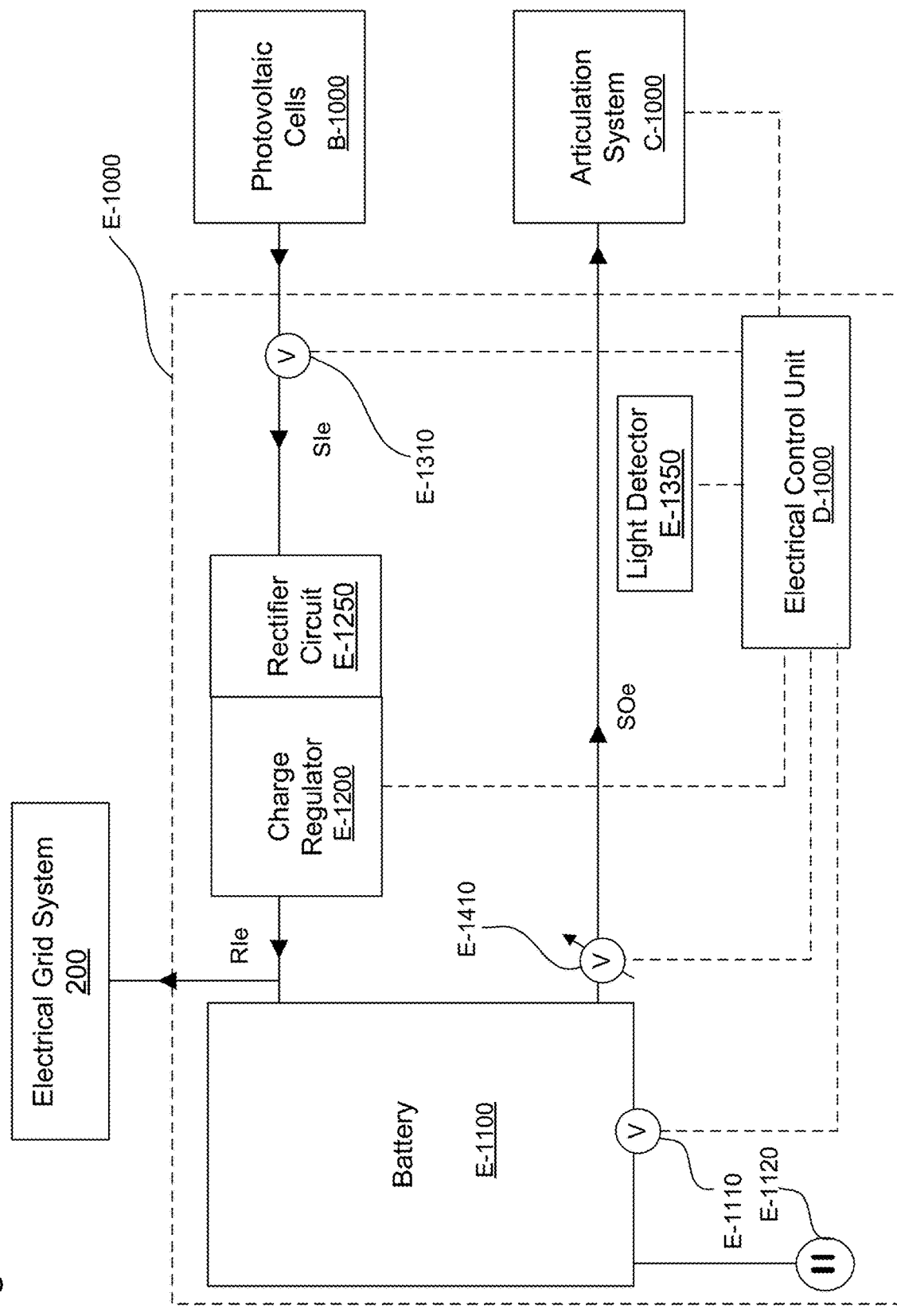
FIG. 4 is a schematic view of a battery assembly of the carport module, according to certain aspects of the disclosure.

The plurality of photovoltaic panels B-1000 can receive the sunlight and generate solar energy under the form of solar input electricity SIe, as illustrated in FIG. 4.

The articulation system C-1000 rotatably connects the support structure A-1000 to a ground surface 100, e.g. parking surface, and rotate the support structure A-1000 around a rotation axis Z substantially parallel to the ground surface 100 to articulate the solar carport module 1000 between the service position and the shelter position.

The battery assembly E-1000 can receive, convert, store and/or transfer to an electrical grid system 200 the solar input electricity SIe, as illustrated in FIG. 4. The stored energy can be later used in external elements of the carport module 1000, e.g. electrical cars, parking lighting system, or the like, through an electrical connection E-1120, e.g. electric car charging station, as illustrated in FIG. 4.

In addition, a part or a totality of the energy stored in the battery assembly E-1000 can be reinjected into the solar carport module 1000 to further increase efficiency of the solar carport module 1000. For example, the battery assembly E-1000 can provide solar output electricity SOe, as illustrated in FIG. 4, to articulate the support structure A-1000 through the articulation system C-1000 and to increase the sunlight exposure of the plurality of photovoltaic panels B-1000 to the sunlight.

The electrical control unit D-1000 can be configured to manage the battery assembly E-1000 in order to optimize and/or maximize energy harvesting by the carport module 1000.

FIGS. 2A-2F are perspective and a side views of the carport module 1000 in an isosceles triangular configuration, perspective and a side views of the carport module 1000 in aright triangular configuration, and perspective and a side views of the carport module 1000 in an adjacent configuration, according to certain aspects of the disclosure.

The support structure A-1000 can include a pair of trusses A-1100 that protrudes from the ground surface 100 and flares in the upward direction to provide parking spaces between the pair of trusses A-1100, and a plurality of rails A-1200 extending between the pair of trusses A-1100 and above the ground surface 100.

Each truss of the pair of trusses A-1100 can include a summit A-1110 affixed to the articulation system C-1000, as illustrated in FIG. 1, a base A-1140 facing the summit A-1110 and affixed to the plurality or rails A-1200 by terminal portions A-1210 of the plurality of rails A-1200, a first side member A-1120 that connects the summit A-1110 to a first terminal portion A-1142 of the base A-1140, and a second side members A-1130 that connects the summit A-1110 to a second terminal portion A-11144 of the base A-1140.

In addition, the pair of trusses A-1100 can have transversal members A-1150 that connects the first and second side members A-1120, A-1130 between each other and/or the summit A-1110 to the base A-1140 to enhance strength and rigidity of the pair of trusses A-1100.

The pair of trusses A-1100 can have geometrical configurations, e.g. shapes, dimensions, such that the articulation of the support structure A-1000 between the service position and the shelter position can be performed by a single rotation of the pair of trusses A-1100 around the axis of rotation Z with a rotation angle A and wherein in the shelter position the plurality of photovoltaic panels B-1000 receives the sunlight and in the service position the plurality of photovoltaic panels B-1000 are manually reachable. In the context of the present disclosure the plurality of photovoltaic panels B-1000 are "manually reachable" when it can be accessed for cleaning and/or servicing by a user 500 standing on the ground surface 100 with a tool, e.g. sweeper pole, having length of from 0.0 to 5 meters, as illustrated in FIG. 1.

The rotation angle A can be sufficiently small to provide an articulation of the pair of trusses A-1100 between the service position and the shelter position that is short, e.g. in the order of minutes, and sufficiently large to allow the plurality of photovoltaic panels B-1000 to reachable in the service position and exposed to the sunlight in the shelter position. For example, the rotation angle A can be between 25° and 65° and preferably between 40° and 50°.

Figure 2A:
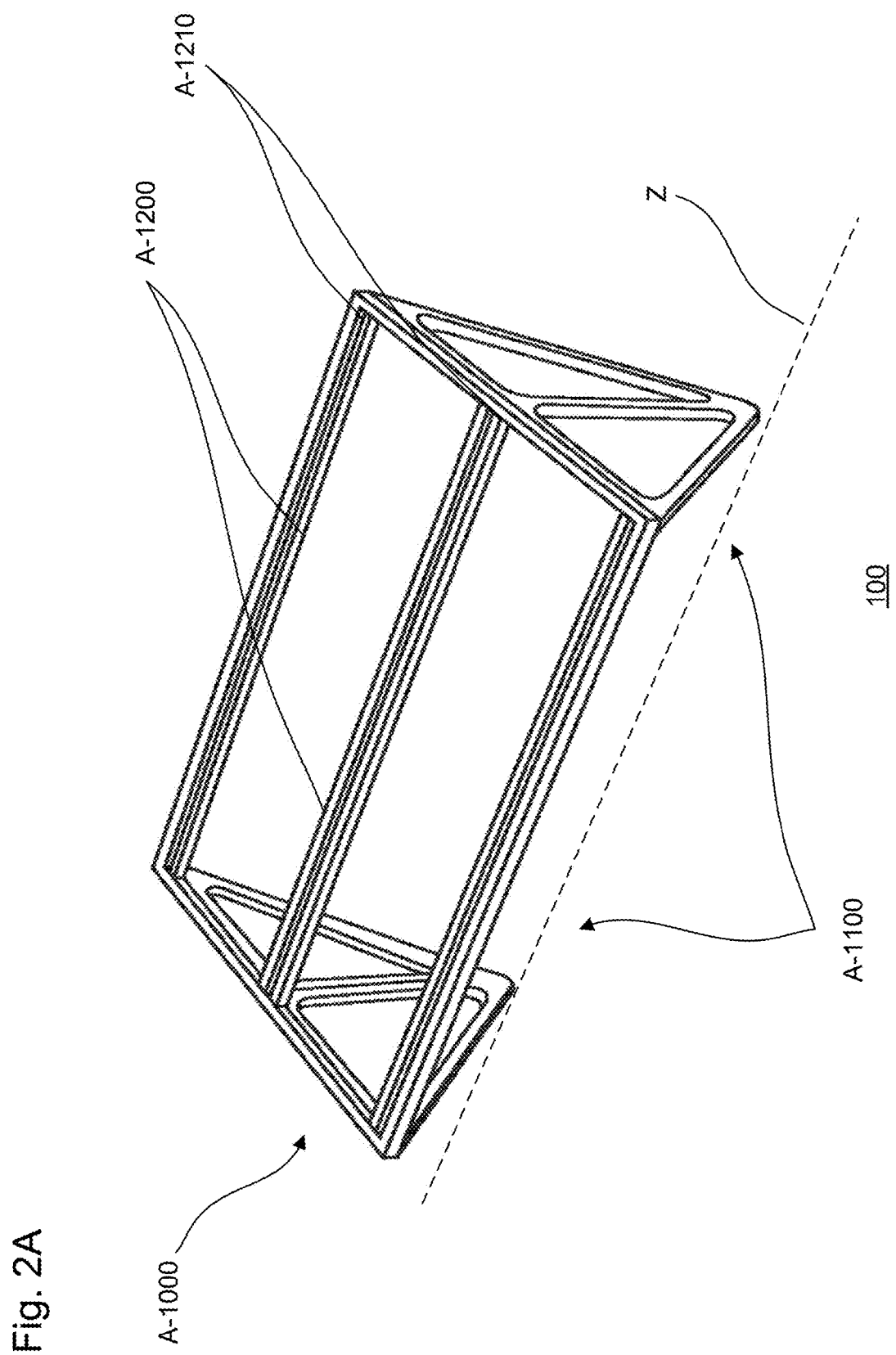
FIG. 2A is a perspective view of a support structure of the carport module in a isosceles triangular configuration, according to certain aspects of the disclosure.
Figure 2B:
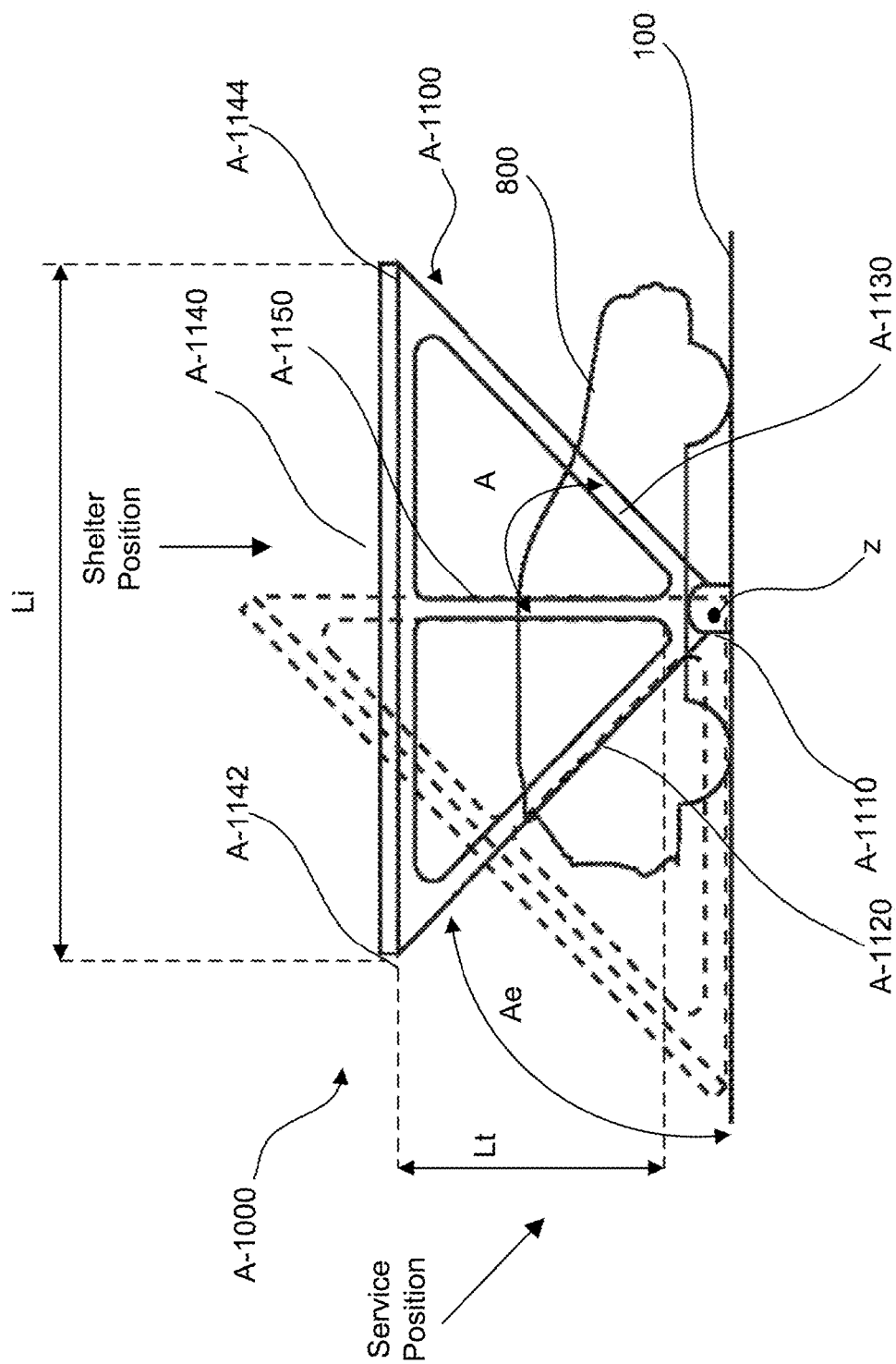
FIG. 2B is a side view of the support structure of the carport in the isosceles triangular configuration, according to certain aspects of the disclosure.

For example, the pair of trusses A-1100 can have an isosceles triangular configuration, as illustrated in FIGS. 2A-2B, wherein the base A-1140, the first side member A-1120, and the second side member A-1130 have substantially the same length Li. In the isosceles triangular configuration, when the support structure A-1000 is articulated in the service position the first side member A-1120 is in contact with the ground surface 100 while when the support structure A-1000 is articulated in the shelter position the first side member A-1120 formed a shelter angle Ae with the ground surface 100 to have the base A-1140 substantially parallel with the ground surface 100, e.g. the base A-1140 forms with the ground surface 100 an angle between −20° and 20°, and preferably between −10° and 10°, and more preferably between −5° and 5°.

In the isosceles configuration, the dimensions of the pair of trusses A-1100 are selected to provide coverage for standard size passenger cars and/or light-duty trucks, when articulated in the shelter position, and to have the plurality of photovoltaic panels B-1000 reachable by the user 500. For example, the length Li of the base A-1140, the first side member A-1120, and the second side member A-1130 can be between 3.50 m and 7.00 m, and preferably between 4.50 m and 6.00 m, and more preferably between 5.00 m and 5.50 m. The shelter angle Ae can be between 110° and 160°, and preferably between 120° and 150°, and more preferably between 130° and 140°. The exposure angle Ae can be between 10° and 80°, and preferably between 30° and 60°, and more preferably between 40° and 50°. Alternatively, the transversal members A-1150 can have a length Lt between 3.00 m and 6.00 m, and preferably between 4.00 m and 5.00 m, and more preferably between 4.25 m and 4.75 m.

Figure 2C:
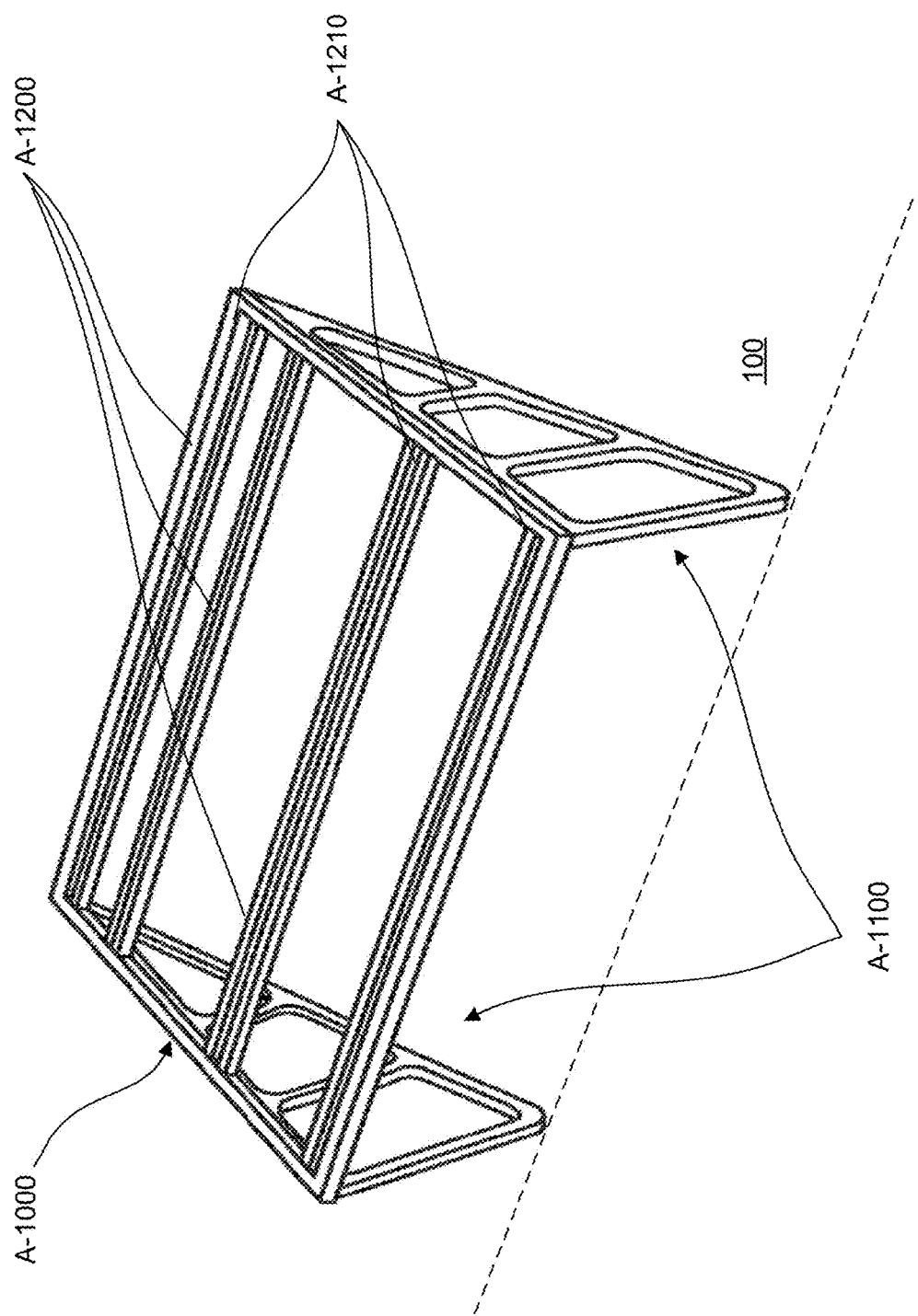
FIG. 2C is a perspective view of the support structure in a right triangular configuration, according to certain aspects of the disclosure.
Figure 2D:
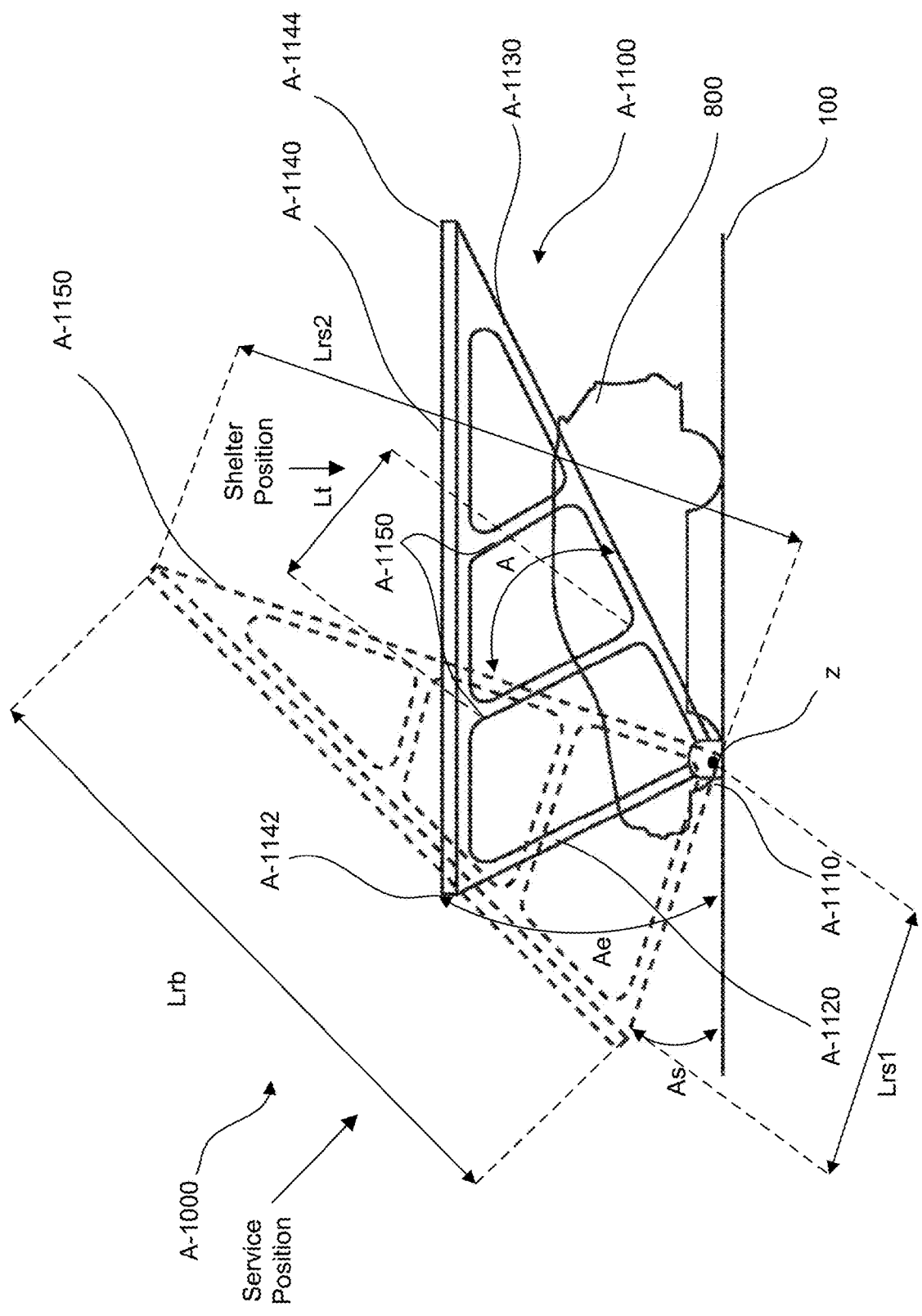
FIG. 2D is a side view of the support structure in the right triangular configuration, according to certain aspects of the disclosure.

In another example, the pair of trusses A-1100 can have a right triangular configuration, as illustrated in FIGS. 2C-2D, wherein the first side member A-1120 and the second side member A-1130 formed a substantially right angle and the base A-1140 has a length Lrb larger than a length Lrs1 of the first side member A-1120 and a length Lrs2 of the second side member A-1130. In this right triangular configuration, when the support structure A-1000 is articulated in the service position the first side member A-1120 is not in contact with the ground surface and forms a service angle As while when the support structure A-1000 is articulated in the shelter position the first side member A-1120 formed the shelter angle Ae with the ground surface 100 to have the base A-1140 substantially parallel with the ground surface 100, e.g. the base A-1140 and the ground surface 100 forms an angle between −20° and 20°, and preferably between −10° and 10°, and more preferably between −5° and 5°.

In the right triangular configuration, the dimensions of the pair of trusses A-1100 are selected to provide coverage for standard size passenger cars and/or light-duty trucks, when articulated in the shelter position, and to have the plurality of photovoltaic panels B-1000 reachable by the user 500. For example, the length Lrb of the base A-1140 can be between 4.50 and 9.00 m, and preferably between 5.50 m and 7.00 m, and more preferably between 6.00 m and 6.50 m. Alternatively, the transversal members A-1150 can have a length Lt between 3.00 m and 6.00 m, and preferably between 4.00 m and 5.00 m, and more preferably between 4.25 m and 4.75 m. The service angle As can be between 5° and 35°, and preferably between 10° and 300, and more preferably between 15° and 25°. The exposure angle Ae can be between 30° and 90°, and preferably between 50° and 75°, and more preferably between 60° and 65°.

Figure 2E:
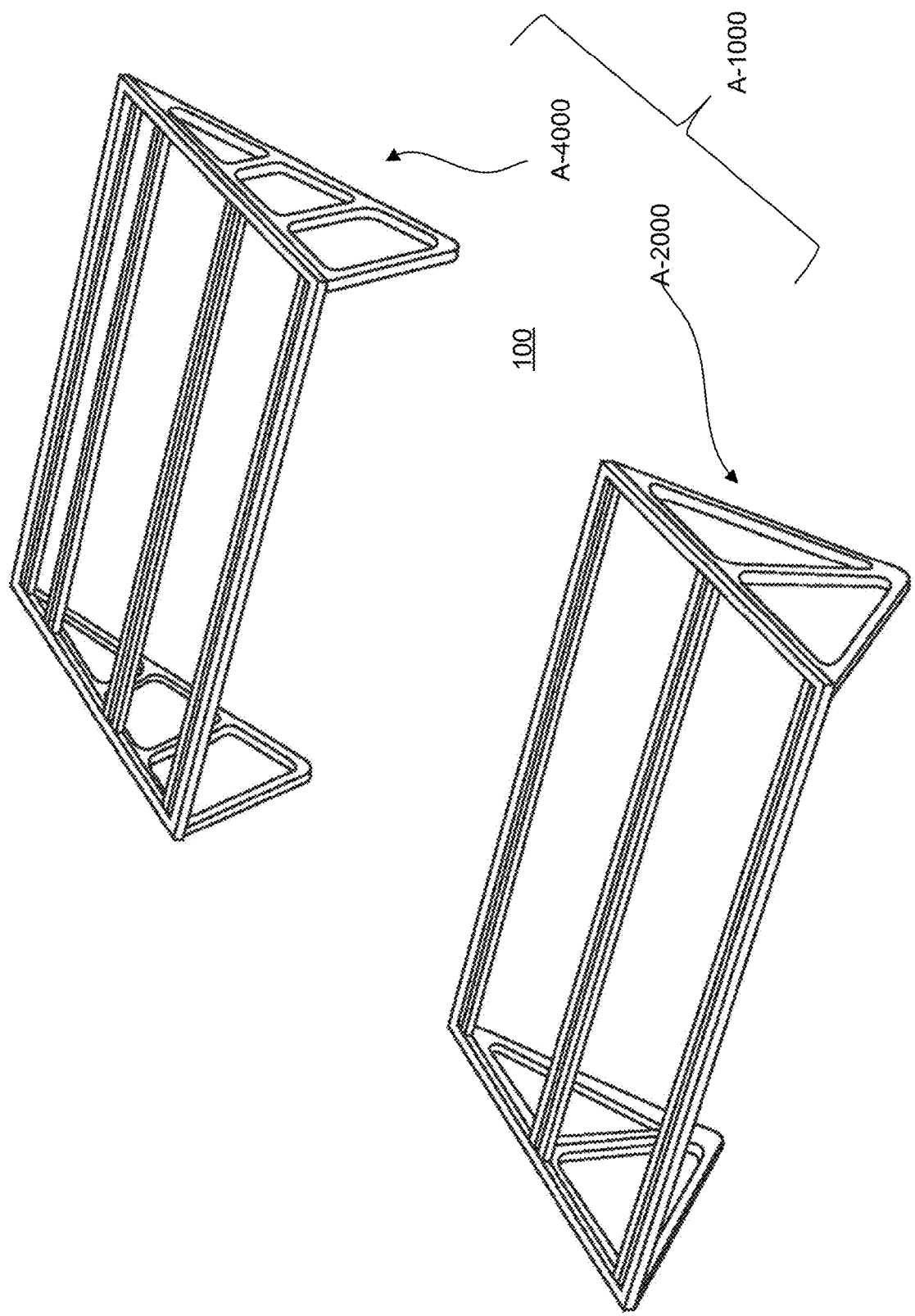
FIG. 2E is a perspective view of different support structures positioned adjacently, according to certain aspects of the disclosure.
Figure 2F:
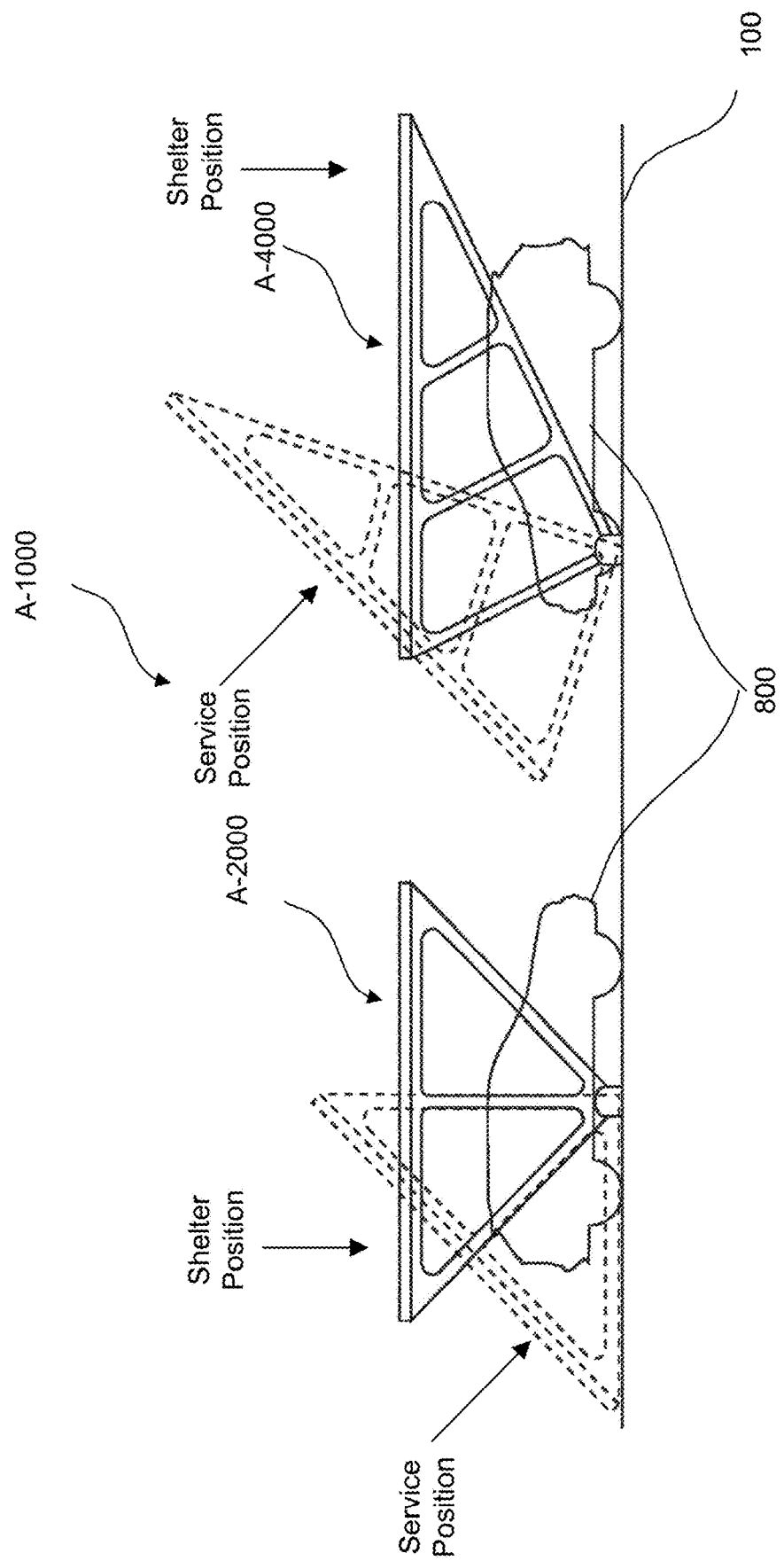
FIG. 2F is a side view of different support structures positioned adjacently, according to certain aspects of the disclosure.

In addition, the carport module 1000 can have an adjacent configuration and include a first pair of trusses A-2000 in the isosceles triangular configuration and a second pair of trusses A-4000 in the right triangular configuration adjacent to the first pair of trusses A-2000, as illustrated in FIGS. 2E-F.

Figure 3:
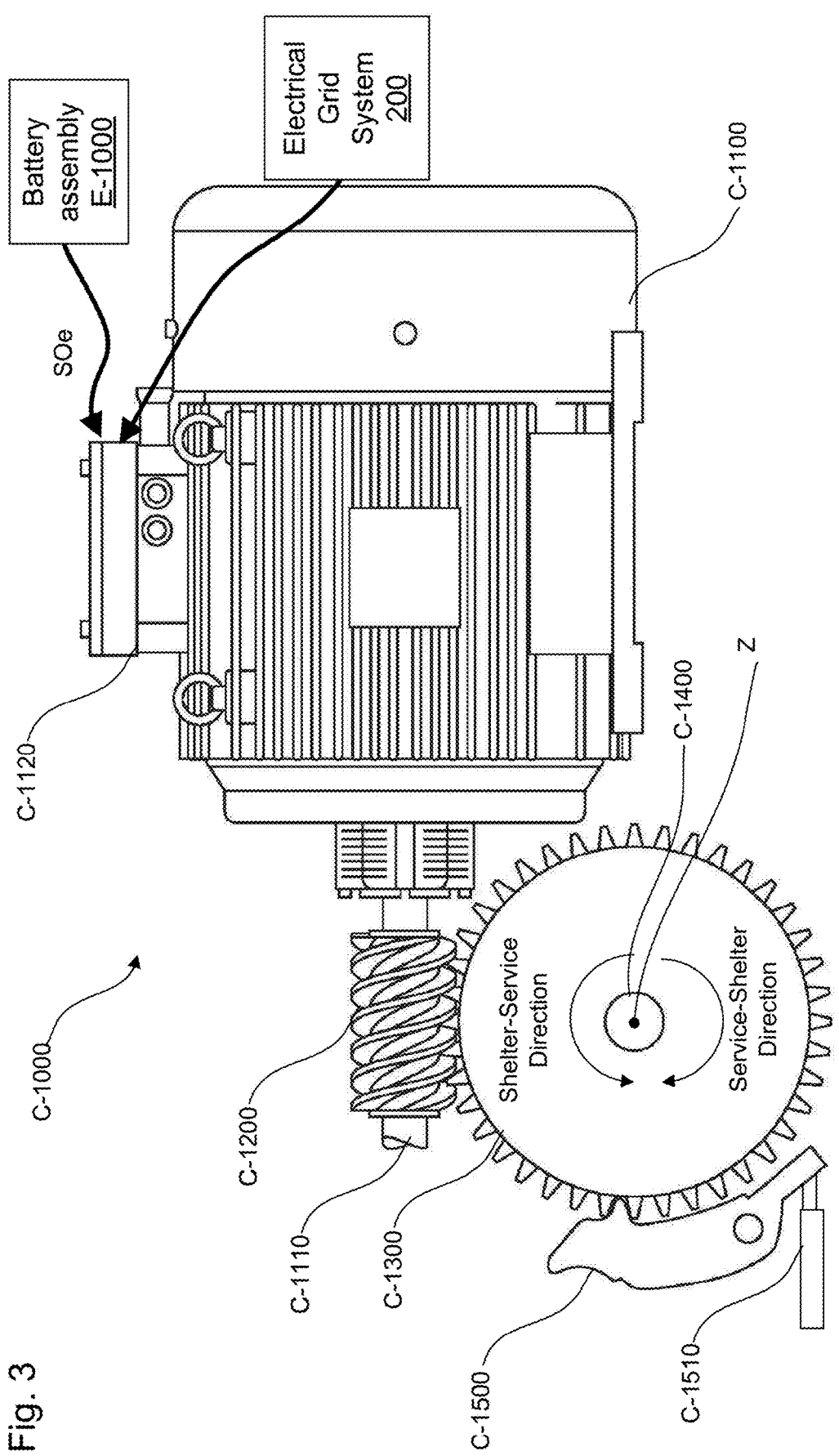
FIG. 3 is a side view of an articulation system of the carport module, according to certain aspects of the disclosure.

FIG. 3 is a side view of the articulation system C-1000 of the carport module 1000, according to certain aspects of the disclosure.

The articulation system C-1000 can provide rotation of the pair of trusses A-1100 around the rotation axis Z in a service-shelter direction from the service position to the shelter position, as illustrated by arrows in the clockwise direction in FIG. 3, and in a shelter-service direction from the shelter position to the service position, as illustrated by arrows in the counter-clockwise direction in FIG. 3.

The articulation system C-1000 can include an electrical motor C-1100 with a shaft C-1110 and a reversing switch C-1120, a worm C-1200 affixed to the shaft C-1110, a gear C-1300 that meshes with the worm C-1200, and a pivot C-1400 positioned around the rotation axis Z and affixed to the gear C-1300.

The electrical motor C-1100 can receive the solar output electricity SOe from the battery assembly E-1000 and/or external electricity form the electrical grid system 200 and rotate the shaft C-1110, the rotation of the shaft C-1110 and the worm C-1200 can rotate the gear C-1300 and the pair of trusses A-1100 around the pivot C-1400 and the axis of rotation Z.

The reversing switch C-1120 can be operated to force the electrical motor C-1100 to rotate in the service-shelter direction or in the shelter-service direction.

Performance characteristics of the electrical motor C-1100 and gear ratios between the worm C-1200 and the gear C-1300 can be configured to provide a predetermined torque T sufficiently large to enable the rotation of the pair of trusses A-1100. For example, the predetermined torque T can be between 1 kN·m and 1000 kN·m, and preferably between 10 kN·m and 100 kN·m.

In addition, the articulation system C-1000 can include a ratchet C-1500 that can lock and unlock the gear C-1300 to position the pair of trusses A-1100 through a plurality of intermediary positions between the service position and the shelter position, and vice-versa. The plurality of intermediary positions provide incremental step motions between the service position and the shelter position, and vice-versa, that enhance sunlight tracking further enhance efficiency of the carport module 1000.

The ratchet C-1500 can include a ratchet actuator C-1510, e.g. a solenoid, an electromagnet, or the like, that is configured to receive command signals from the electrical control unit D-1000 to engage the ratchet C-1500 and lock the gear C-1300 and to disengage the ratchet C-1500 and unlock the gear C-1300.

FIG. 4 is a schematic view of the battery assembly E-1000 of the carport module 1000, according to certain aspects of the disclosure.

The battery assembly E-1000 can include a battery E-1100 with a battery voltmeter E-1110, a charge regulator E-1200 with a rectifier circuit E-1250 electrically connecting the plurality of photovoltaic panels B-1000 to the battery E-1100, an input voltmeter E-1310 positioned between the rectifier circuit E-1250 and the plurality of photovoltaic panels B-1000, a light detector E-1350, an output voltage adjuster E-1410 positioned between the battery E-1100 and the articulation system C-1000, and an electronic control unit D-1000 that can read the battery voltmeter E-1110, the input voltmeter E-1310, and actuate the output voltage adjuster E-1410, and the charge regulator E-1200.

The charge regulator E-1200 and the rectifier circuit E-1250 can receive, rectify, and regulate the solar input electricity SIe from the plurality of photovoltaic panels B-1000 to provide regulated input electricity RIe to the battery E-1100. The charge regulator E-1200 can prevent transferring over voltages to the battery E-1100 to enhance battery performance and lifespan by providing the regulated input electricity RIe as an average of the solar input electricity SIe over a predetermined period of time.

The charge regulator E-1200 can be a stand-alone device, as illustrated in FIG. 4, or circuitry integrated to the battery E-1100. To provide the regulated output electricity RIe, the charge regulator E-1200 can rely on Pulse Width Modulation (PWM) and/or Maximum Power Point-Tracker (MPPT) technologies.

In addition, the charge regulator E-1200 can be coupled with the rectifier circuit E-1250, as illustrated in FIG. 4, to rectify the solar output electricity SOe that can be an alternative current and provide a direct current to the charge regulator E-1200.

The battery E-1100 can store the regulated output electricity RIe to be concurrently or later used in external elements of the carport module 1000, e.g. electrical cars, parking lighting system, or the like, through the electrical connection E-1120, e.g. electric car charging station. The battery E-1100 can be a single or a plurality of alkaline batteries, lead acid batteries, lithium-ion batteries, or the like.

The electrical control unit D-1000 can monitor and control the carport module 1000 by receiving reading signals from the battery voltmeter E-1110 indicative of a charge level of the battery E-1100, reading signals from the input voltmeter E-1310 indicative of a voltage value of the solar input electricity SIe, and reading signals from the light detector E-1350 indicative of a sunlight direction, as well as by providing to the charge regulator E-1200 command signals indicative of a voltage decrease of the solar input electricity SIe, to the output voltage adjuster E-1410 command signals indicative of a voltage increase of the solar output electricity SOe, to the articulation system C-1000 command signals indicative of a position of the pair of trusses A-1100, via the ratchet actuator C-1510 and the reversing switch C-1120.

The electrical control unit D-1000 and functionalities associated with the electrical control unit D-1000 will be described in details in following paragraphs and figures.

Figure 5:
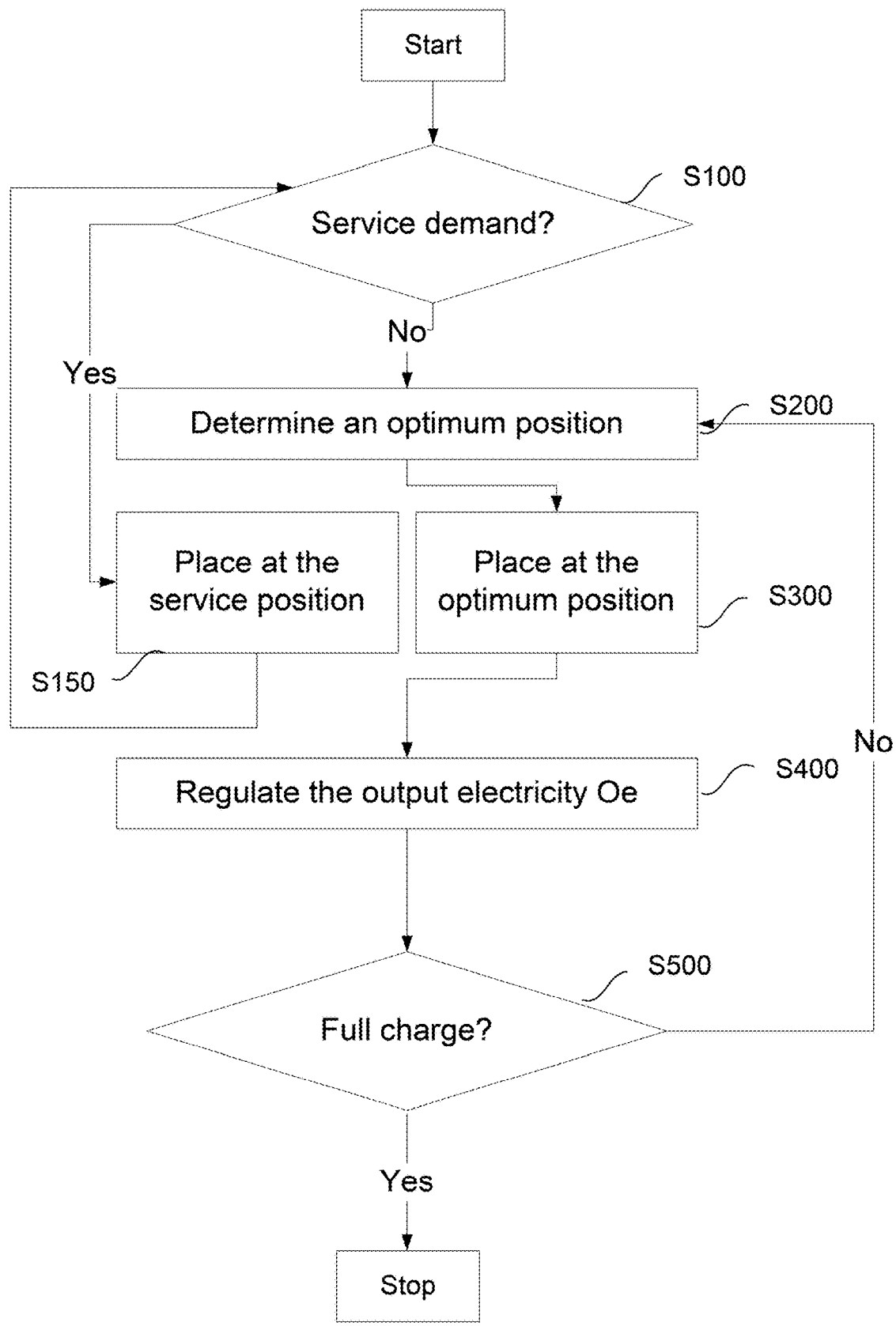
FIG. 5 is a flow chart of a method for harvesting energy through the carport module, according to certain aspects of the disclosure.

FIG. 5 is a flow chart of a method for harvesting energy through the carport module 1000, according to certain aspects of the disclosure.

In a step S100, a demand or request to position the pair of trusses A-1100 in the service position is detected or recorded. The command or request to position the pair of trusses A-1100 in the service position can be detected by manual entry from the user 500, via an electrical switch or an I/O interface D-1016, e.g. graphical user interface, of the electronic control unit D-1000.

If the command or request to position the pair of trusses A-1100 in the service position is detected or recorded the process goes to a step S150. Otherwise, the process goes to a step S200.

In the step S150, the articulation system C-1000 is actuated to position and lock the pair of trusses A-1100 at the service position. The articulation system C-1000 can be actuated via the reversing switch C-120 of the electrical motor C-1100 and the ratchet actuator C-1510 of the ratchet C-1500 and through software instructions executed by the electrical control unit D-1000. Then, the process goes back to the step S100.

In the step S200, a maximum sunlight exposure position for the pair of trusses A-1100 and consequently the plurality of photovoltaic panels B-1000 is determined. The determination of the maximum sunlight exposure position can be performed via reading signals from the light detector E-1350 indicative of the sunlight direction and through software instructions executed by the electrical control unit D-1000. For example, the maximum sunlight exposure position can be determined as an intermediary position between the service position and shelter position that places the plurality of photovoltaic panels B-1000 substantially perpendicular to the sunlight direction.

In the step S300, the articulation system C-1000 is actuated to position and lock the pair of trusses A-1100 at the maximum sunlight exposure position previously determined in the step S200.

The articulation system C-1000 can be actuated via the reversing switch C-1120 of the electrical motor C-1100 and the ratchet actuator C-1510 of the ratchet C-1500 and through software instructions executed by the electrical control unit D-1000.

In a step S400, the solar input electricity SIe is regulated to provide the regulated input electricity RIe via the charge regulator E-1200 and through software instructions executed by the electrical control unit D-1000. For example, the electrical control unit D-1000 can actuate the charge regulator E-1200 to reduce, e.g. through heat dissipation, the solar input electricity SIe when voltage values of the solar input electricity SIe are above a predetermined maximum battery threshold. The predetermined maximum battery threshold can correspond to voltage values for which the battery E-1100 can be damaged.

In a step S500, it is detected if the battery E-1100 is fully charged. The full charge of the battery E-1100 can be determined with a voltage value of the battery E-1100 that is measured via the battery voltmeter E-1110, see FIG. 4, and through software instructions executed by the electrical control unit D-1000. For example, the full charge of the battery E-1100 can be detected if the voltage value of the battery E-100 is above a maximum voltage charge of the battery E-1100.

If the full charge of the battery E-1100 is detected, the process stops. Otherwise, the process goes back to the step S200.

Figure 6:
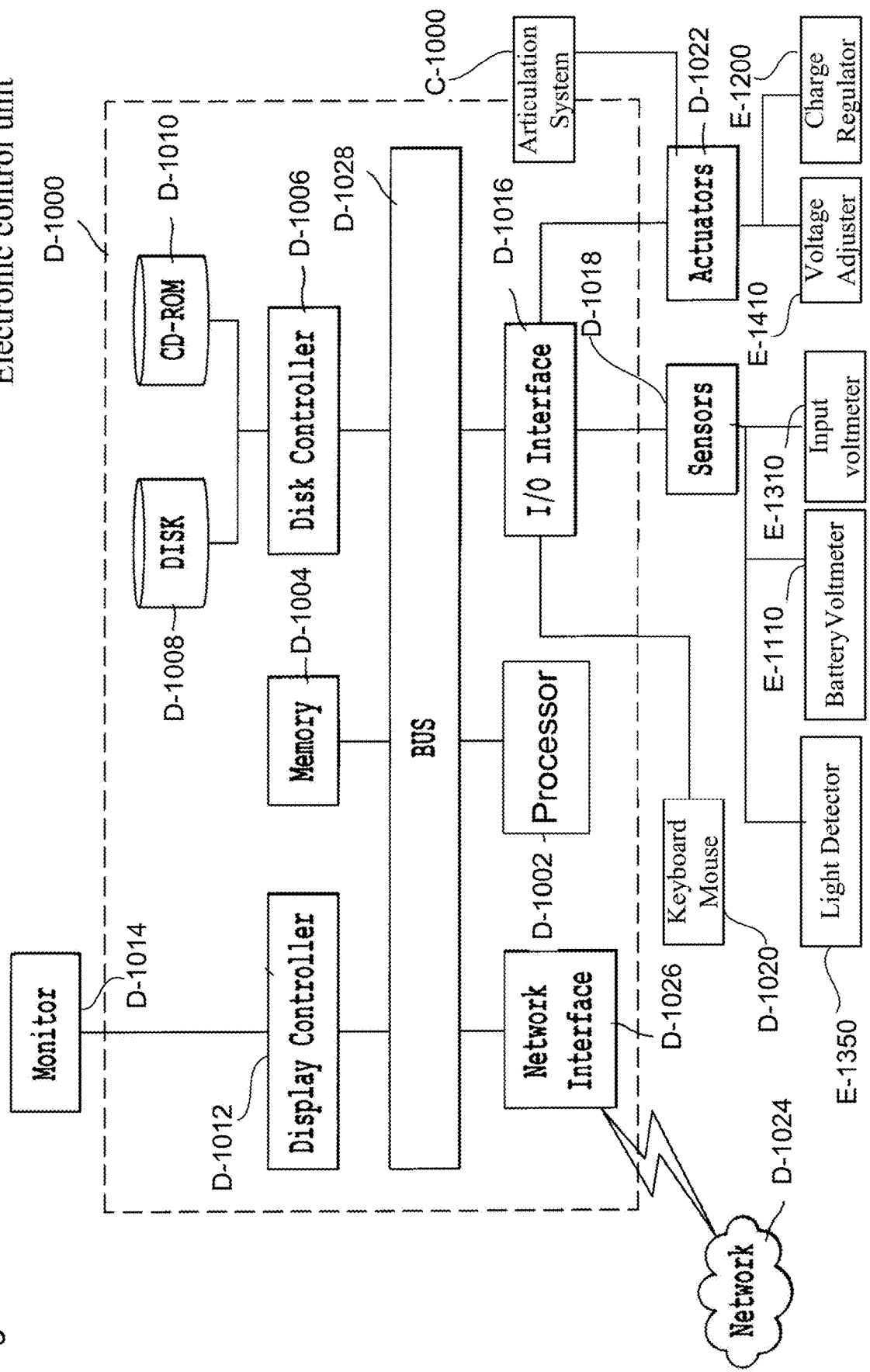
FIG. 6 is a schematic view of a hardware diagram of an electrical control unit of the battery assembly, according to certain aspects of the disclosure.

FIG. 6 is a schematic view of a hardware diagram of an electrical control unit of the carport module 1000, according to certain aspects of the disclosure.

As shown in FIG. 6, systems, operations, and processes in accordance with this disclosure may be implemented using a processor D-1002 or at least one application specific processor (ASP). The processor D-1002 may utilize a computer readable storage medium, such as a memory D-1004 (e.g., ROM, EPROM, EEPROM, flash memory, static memory, DRAM, SDRAM, and their equivalents), configured to control the processor D-1002 to perform and/or control the systems, operations, and processes of this disclosure. Other storage mediums may be controlled via a disk controller D-1006, which may control a hard disk drive D-1008 or optical disk drive D-1010.

The processor D-1002 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor D-1002 may be a separate device or a single processing mechanism. Further, this disclosure may benefit form parallel processing capabilities of a multi-cored processor.

In another aspect, results of processing in accordance with this disclosure may be displayed via a display controller D-1012 to a monitor D-1014 that may be peripheral to or part of the electrical control unit D-1000. Moreover, the monitor D-1014 may be provided with a touch-sensitive interface to a command/instruction interface. The display controller D-1012 may also include at least one graphic processing unit for improved computational efficiency. Additionally, the electrical control unit D-1000 may include an I/O (input/output) interface D-1016, provided for inputting sensor data from sensors D-1018 and for outputting orders to actuators D-1022. The sensors D-1018 and actuators D-1022 are illustrative of any of the sensors and actuators described in this disclosure. For example, the sensors D-1018 can be the battery voltmeter E-1110, the input voltmeter E-1310, and the light detector E-1350, while the actuators D-1022 can be the charge regulator E-1200, the output voltage adjuster E-1410, and the articulation system C-1000.

Further, other input devices may be connected to an I/O interface D-1016 as peripherals or as part of the electrical control unit D-1000. For example, a keyboard or a pointing device such as a mouse D-1020 may control parameters of the various processes and algorithms of this disclosure, and may be connected to the I/O interface D-1016 to provide additional functionality and configuration options, or to control display characteristics. Actuators D-1022 which may be embodied in any of the elements of the apparatuses described in this disclosure may also be connected to the I/O interface D-1016.

The above-noted hardware components may be coupled to the network D-1024, such as the Internet or a local intranet, via a network interface D-1026 for the transmission or reception of data, including controllable parameters to a mobile device. A central BUS D-1028 may be provided to connect the above-noted hardware components together, and to provide at least one path for digital communication there between.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A solar carport module comprising:
a support structure to provide shelter to a vehicle, the support structure having:
a pair of trusses rotatably affixed to a ground surface on which the vehicle is parked;
a plurality of photovoltaic panels mounted between the pair of trusses to provide solar electricity;
a battery assembly that electrically connects the plurality of photovoltaic panels to receive, regulate, and store the solar electricity;
an articulation system that rotates the pair of trusses between a shelter position and a service position,
wherein each truss of the pair of trusses has a summit portion affixed to the articulation system and a base portion opposite to the summit portion that supports the plurality of photovoltaic panels,
wherein the articulation system further includes a gear affixed to the pair of trusses, a worm that meshes into the gear, and an electrical motor that rotates the worm,
wherein each truss includes a first side member and a second side member that connect the summit portion and the base portion,
wherein in the shelter position the plurality of photovoltaic panels are substantially parallel to the ground surface and in the service position the photovoltaic panels are manually reachable by a user standing on the ground surface,
wherein each truss has an isosceles triangular shape, and
wherein the first side member of each truss contacts the ground surface when the pair of trusses is in the service position.

2. The solar carport module of claim 1, wherein the articulation system further includes a ratchet that engages and disengages the gear to lock and unlock the pair of trusses in the service position and in the shelter position.

3. The solar carport module of claim 1, further comprising an electrical control unit configured to detect a maximum sunlight exposure position and to operate the articulation system to place the plurality of photovoltaic panels in the maximum sunlight exposure position.

4. The solar carport module of claim 3, wherein the electrical control unit is further configured to receive reading signals from a light detector indicative of a sunlight direction, and the maximum sunlight exposure position is determined based on the sunlight direction.

5. The solar carport module of claim 3, wherein the electrical control unit is further configured to detect a demand to position the plurality of photovoltaic panels in a service position to have the photovoltaic panels manually reachable by a user standing on the ground surface.

6. The solar carport module of claim 1, wherein the battery assembly provides solar output electricity to articulate the support structure through the electrical motor.

7. The solar carport module of claim 1, wherein the summit portion does not directly connect to the base portion.

8. A solar carport module comprising:
a support structure to provide shelter to a first vehicle and a second vehicle, the support structure having:
a first pair of trusses to delimit a first parking space for the first vehicle and rotatably affixed to a ground surface on which the first vehicle is parked, and
a second pair of trusses adjacent to the first pair of trusses to delimit a second parking space for the second vehicle and rotatably affixed to the ground surface on which the second vehicle is parked;
a plurality of photovoltaic panels mounted between the first pair of trusses and between the second pair of trusses to provide solar electricity;
a battery assembly that electrically connects the plurality of photovoltaic panels to receive, regulate, and store the solar electricity;
an articulation system that rotates the first pair of trusses and the second pair of trusses between a shelter position and a service position, wherein
in the shelter position the plurality of photovoltaic panels are substantially parallel to the ground surface and in the service position the photovoltaic panels are manually reachable by a user standing on the ground surface,
wherein each truss of the first and second pair of trusses has a summit portion affixed to the articulation system and a base portion opposite to the summit portion that supports the plurality of photovoltaic panels, and
wherein each truss of the first and second pair of trusses includes a first side member and a second side member that connect the summit portion and the base portion,
wherein each truss of the first pair of trusses has an isosceles triangular shape and each truss of the second pair of trusses has a right triangular shape, and wherein the first side member of each truss of the first pair of trusses contacts the ground surface when the first pair of trusses and the second pair of trusses are in the service position.

9. The solar carport module of claim 8, wherein the articulation system further includes a first gear affixed to the first pair of trusses, a first worm that meshes into the first gear, and a first electrical motor that rotates the first worm and a second gear affixed to the second pair of trusses, a second worm that meshes into the second gear, and a second electrical motor that rotates the second worm.

10. The solar carport module of claim 9, wherein the articulation system further includes a first ratchet that engages and disengages the first gear to lock and unlock the first pair of trusses in the service position and in the shelter position and a second ratchet that engages and disengages the second gear to lock and unlock the second pair of trusses in the service position and in the shelter position.

\* \* \* \* \*